Sept. 20, 1938.  E. G. MUNZ  2,130,810

SPRAY HEAD

Filed March 22, 1937

INVENTOR
ELMER G. MUNZ
BY Whittemore, Hulbert & Belknap
ATTORNEYS

Patented Sept. 20, 1938

2,130,810

UNITED STATES PATENT OFFICE 2,130,810

SPRAY HEAD

Elmer G. Munz, Detroit, Mich.

Application March 22, 1937, Serial No. 132,421

12 Claims. (Cl. 299—141)

The invention relates generally to spraying equipment and more particularly to water spraying nozzles for irrigation purposes adapted both for portable spraying devices and for group-type systems.

The present invention is, in some respects, an improvement in spraying devices disclosed and claimed in my co-pending application, Serial No. 667,693, filed April 24, 1933.

The principal object of the invention is to provide a sprinkler head that will operate efficiently on low pressures and with a low capacity of water so that the underground type of system may be more easily adapted to small homes served with only a small supply pipe, especially in communities having low water pressure. The object is also to cover large areas with comparatively few sprinklers and to reduce pipe sizes so that the cost of underground systems may be brought within reasonable limits and thereby made available generally for landscape irrigation as well as for commercial gardening and farming.

A further object is to provide a spray head which, while covering a large area remote from the head, will also irrigate the area immediately adjacent the head.

Other objects of the invention will become more apparent as this description proceeds, especially when considered in connection with the accompanying drawing, wherein—

One of the principal features of the present invention is the construction of a spray head to provide a plurality of circumferentially spaced serrations which gradually increase in cross sectional area from the point where the water enters the serrations to the point where the water leaves the same. In my co-pending application above referred to, the spraying nozzles had circumferentially spaced serrations which were of uniform cross section throughout their lengths. In its broader aspects the present invention contemplates constructions similar to those described in the prior application, modified to produce the advantageous effects due to the increasing cross sectional area of the serrations.

The present invention is adapted to be used in portable-type sprinklers similar to Figure 10 of my prior application, to stationary heads adapted to be substantially flush with the ground level similar to Figure 9 of the prior application and to the so-called pop-up type heads as illustrated in Figure 8 of the prior application. Therefore in the present application I have specifically illustrated only the movable spray head of the pop-up type construction, since its adaptation to the other types of spraying devices will be readily apparent.

Figure 1:
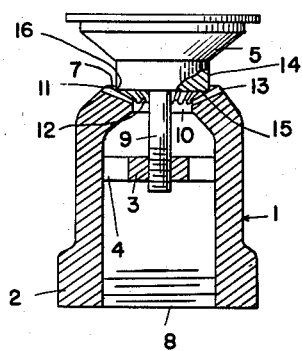
Figure 1 is a longitudinal section through a spray head constructed in accordance with this invention.
Figure 2:
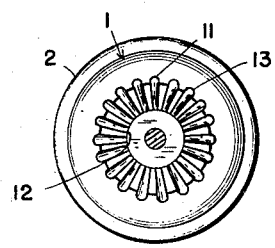
Figure 2 is a plan view of the spray head with the cap removed exposing the serrations.

In Figures 1 and 2 I have illustrated a spray head having a body 1 provided with interior threads 8 so that it may be connected to a supply pipe to form a stationary spraying device. The body is also provided with an external annular flange 2 so that it may, if desired, be used in the pop-up type of sprinkler as shown in Figure 8 of my prior application. The body is provided with a core or web 3 having openings 4 to allow the passage of the water. The core is threaded to engage the stem 9 of the cap 5 and hold the same in firm contact with the frusto-conical seat 7 surrounding the discharge opening 10 in the body. The seat 7 is provided with a series of circumferentially spaced grooves 11 which, as shown, extend radially. These grooves or serrations are of smaller cross section at the inner ends 12 than at the outer ends 13 thereof.

The cap 5 has in the construction illustrated in Figure 1 a cylindrical portion 14 and a flat face 15 perpendicular thereto forming an annular edge 16 which is adapted to contact with the frusto-conical seat 7 between the opposite ends of the grooves 11.

With the construction as shown, the water passing through the openings 4 is discharged through the serrations 11 and is metered by the size of the orifices formed between the serrations and the annular edge 16. The cap forms a closure for the nozzle opening 10 and is in annular contact with the conical seat at all points except where the serrations pass through the seat. The seat and the cap therefore coact to form the serrations into a plurality of orifices. The serrations may be around the entire circumference of the seat as shown in Figure 2, but it is to be understood that if desired they may be formed in a segment only to form directional sprayers or sprayers covering areas that are segments of a circle, the cap being in contact with the seat at all points except where the serrations are cut through, thereby stopping the discharge of water at all other points or directions. Such a segmental type sprayer is shown in Figure 2a of my prior application.

Figure 3:
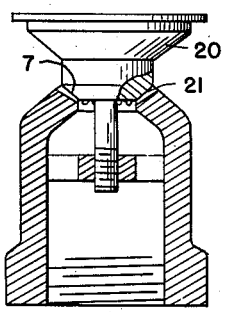
Figure 3 is a view similar to Figure 1 showing a modified construction of cap member.

While the cap is shown making an annular line contact with the seat in Figure 1, this is not always necessary for satisfactory performance, and in many cases it is permissible and desirable to have a surface contact between the cap and the body seat. Thus as shown in Figure 3, the cap 20 has a frusto-conical surface 21 which engages the seat 7 over its entire surface, otherwise the construction of Figure 3 is similar to that of Figure 1. The sharp edge on the cap in Figure 1 is of assistance in breaking-up the water, particularly on very low pressures, but where the water pressure available is reasonably high, the construction of Figure 3 is satisfactory.

As previously stated, the serrations are of increasing cross sectional area from the inner to the outer ends thereof. While the divergence of the sides of the grooves is only very small in practice, the water tends to follow the walls and therefore breaks up or spreads slightly after it leaves the head so that the water is not discharged in a solid stream, but has considerable feathering which breaks away from the main part of the stream to water the area near the head. In the constructions shown in Figures 1, 2 and 3, the serrations are both wider and deeper as they approach the point of discharge, but it is not necessary that they be enlarged in more than one direction. For example, the serrations may be the same depth throughout their length but become wider at the point of discharge, or they may be the same width throughout their length but deeper at the point of discharge. Furthermore, it is not necessary that the cross sectional area increase uniformly throughout the entire length. The grooves may be straight for a portion of their length and flare for the remaining portion, or they may increase at a greater rate than in direct proportion to their length, in which case the walls will curve outwardly instead of being straight. It is to be understood that my invention contemplates these and other variations from the arrangements specifically illustrated in the drawings, the underlying feature being that there is a slight enlargement of the groove in the direction of the travel of the water.

Figure 4:
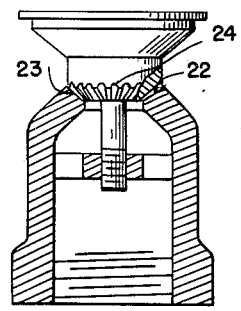
Figure 4 illustrates a modified construction having the serrations in the cap.

In Figure 4 a modified form of the invention is shown in which the frusto-conical seat 22 in the body is smooth and the cooperating frusto-conical seat 23 in the cap is provided with serrations 24 which are of enlarging cross sectional area from the inner to the outer ends thereof.

Figure 5:
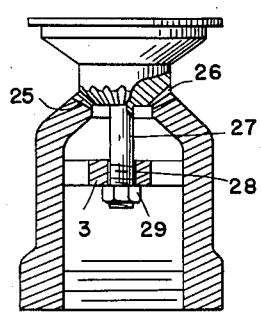
Figure 5 is another modified form of the invention in which both body and cap are serrated.
Figure 6:
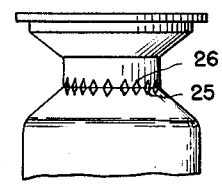
Figure 6 is a diagram showing the relationship of the serrations in the cap and body.
Figure 7:
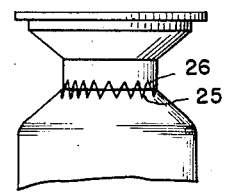
Figure 7 is another diagram showing the relationship of the serrations when the spray head is differently adjusted.

A further modification is shown in Figure 5 in which both the cap and the body are provided with serrations. The serrations 25 in the body are equal in number and spacing to the serrations 26 in the cap. Preferably both are of enlarging cross section in the direction of travel of the water, although in some instances only one or the other may be thus enlarged. In this construction the stem 27 extends through an non-threaded aperture 28 in the core 3 and engages a nut 29 which holds the cap in engagement with the body. By loosening the nut 29 the cap may be angularly adjusted with respect to the body, thereby permitting the cap serrations 26 to be staggered with respect to the body serrations 25, thereby providing twice the number of individual streams, each of which is one-half the size of the streams formed when the serrations coincide. The first or coincidental arrangement is diagrammatically illustrated in Figure 6, while the staggered arrangement is illustrated in Figure 7. The construction of Figure 5 may also be adjusted at positions intermediate those shown in Figures 6 and 7 so that the serrations do not register exactly, in which case the streams are broken-up more definitely. Thus the construction of Figure 5 provides an adjustable spray as well as providing the features disclosed in the other forms of the invention.

The amount of divergence of the grooves in the various constructions illustrated may be predetermined to give a satisfactory spray which will effectively irrigate all of the area between the head and the outer range of the streams. In practice this divergence need not usually be very great, for there is a marked difference between grooves or serrations which have a uniform cross section than those which have an enlarging cross section. In the former case, satisfactory distribution cannot be obtained except by utilizing the inventive features disclosed in my prior application, whereas in the latter case satisfactory distribution may be obtained merely by the action of the enlarged grooves on the streams passing therethrough.

What I claim as my invention is:

1. A spray head comprising a body and a cap, one of which is provided with inclined circumferentially spaced grooves of increasing cross sectional area in the direction of flow, said body and cap having annular contact to form said grooves into orifices.

2. A spray head comprising a body and a cap in annular contact, one of which is provided with circumferentially spaced grooves on the contact surface the bottom of said grooves being arranged conically with respect to the axis of said head, and the sides of said grooves forming passageways larger at the point of discharge than at the point where the liquid enters the grooves.

3. A spray head comprising a body and a cap, said body being provided with circumferentially spaced grooves flaring outwardly, and said cap having annular contact with said body to form the grooves into freely discharging orifices.

4. A spray head comprising a body and a cap in annular contact, each of the contacting surfaces being provided with grooves or serrations of larger cross sectional area at the point of discharge than at the point where the liquid enters the grooves.

5. A spray head comprising a body and a cap in annular contact, each of the contacting surfaces being provided with grooves and means for adjusting one of said contacting surfaces relative to the other so that the grooves in each occupy different relative positions.

6. A spray head comprising a body and a cap in annular contact, each of the contacting surfaces being provided with grooves, the grooves in one of said surfaces being larger at the point of discharge than at the point where the liquid enters the grooves.

7. A spray head comprising a body and a cap in annular contact, each of the contacting surfaces being provided with grooves, the grooves in one of said surfaces being larger at the point of discharge than at the point where the liquid enters the grooves and means for adjusting one of said contacting surfaces relative to the other so that the grooves in each occupy different relative positions.

8. A spray head comprising a body and a cap in annular contact, each of the contacting surfaces being provided with grooves registering with the grooves in the other, the grooves in one of said surfaces being larger at the point of discharge than at the point where the liquid enters the grooves.

9. A spray head comprising a body and a cap having conical surface contact, one of which is provided with circumferentially spaced grooves on the contact surface larger at the point of discharge than at the point where the liquid enters the grooves.

10. A spray head comprising a body and a cap, one of which is provided with inclined circumferentially spaced grooves of increasing cross sectional area in the direction of flow, said body and cap having annular contact to form said grooves into freely discharging, unimpeded orifices.

11. A spray head comprising a body and a cap, one of which is provided with circumferentially spaced grooves of increasing cross sectional area in the direction of flow, said body and cap having annular contact to form said grooves into a series of orifices, said grooves being arranged at such an angle as to discharge liquid in streams inclined to the axis of the spray head.

12. A spray head comprising a body and a cap in annular contact, each of said contacting surfaces being provided with circumferentially spaced grooves leaving circumferentially spaced lands therebetween, said lands being as great in width as the width of said grooves, and means for adjusting one of said contacting surfaces circumferentially relative to the other so that the grooves in one of said members may alternatively register with grooves in the other member, or with the lands in said other member.

ELMER G. MUNZ.